(No Model.)  5 Sheets—Sheet 1.

W. S. WIKLE.
HAY RAKE AND SHOCKER.

No. 425,721. Patented Apr. 15, 1890.

Fig. 1.

WITNESSES:
Chas. Nida
C. Sedgwick

INVENTOR:
W. S. Wikle
BY Munn &Co.
ATTORNEYS.

(No Model.) 5 Sheets—Sheet 2.

W. S. WIKLE.
HAY RAKE AND SHOCKER.

No. 425,721. Patented Apr. 15, 1890.

(No Model.) 5 Sheets—Sheet 5.
W. S. WIKLE.
HAY RAKE AND SHOCKER.

No. 425,721. Patented Apr. 15, 1890.

WITNESSES
C. Sedgwick
J. M. Ritter

INVENTOR
W. S. Wikle
BY
Munn & Co
ATTORNEY

United States Patent Office.

WILBUR S. WIKLE, OF INDIAN CREEK, WEST VIRGINIA.

HAY RAKE AND SHOCKER.

SPECIFICATION forming part of Letters Patent No. 425,721, dated April 15, 1890.

Application filed December 29, 1888. Serial No. 294,912. (No model.)

*To all whom it may concern:*

Be it known that I, WILBUR S. WIKLE, of Indian Creek, in the county of Monroe and State of West Virginia, have invented a new and Improved Hay Rake and Shocker, of which the following is a full, clear, and exact description.

My invention relates to an improvement in hay rakes and shockers, and has for its object to provide a machine of durable construction, which will be completely under the control of the driver; and the further object of the invention is to provide a machine whereby the hay may be expeditiously and cleanly gathered and delivered without waste to a shocker and packed therein; and the object of the invention also is to provide a means whereby the shocker may be quickly dumped and the hay delivered therefrom and conveniently restored to its upright position.

The invention consists in the construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 4:
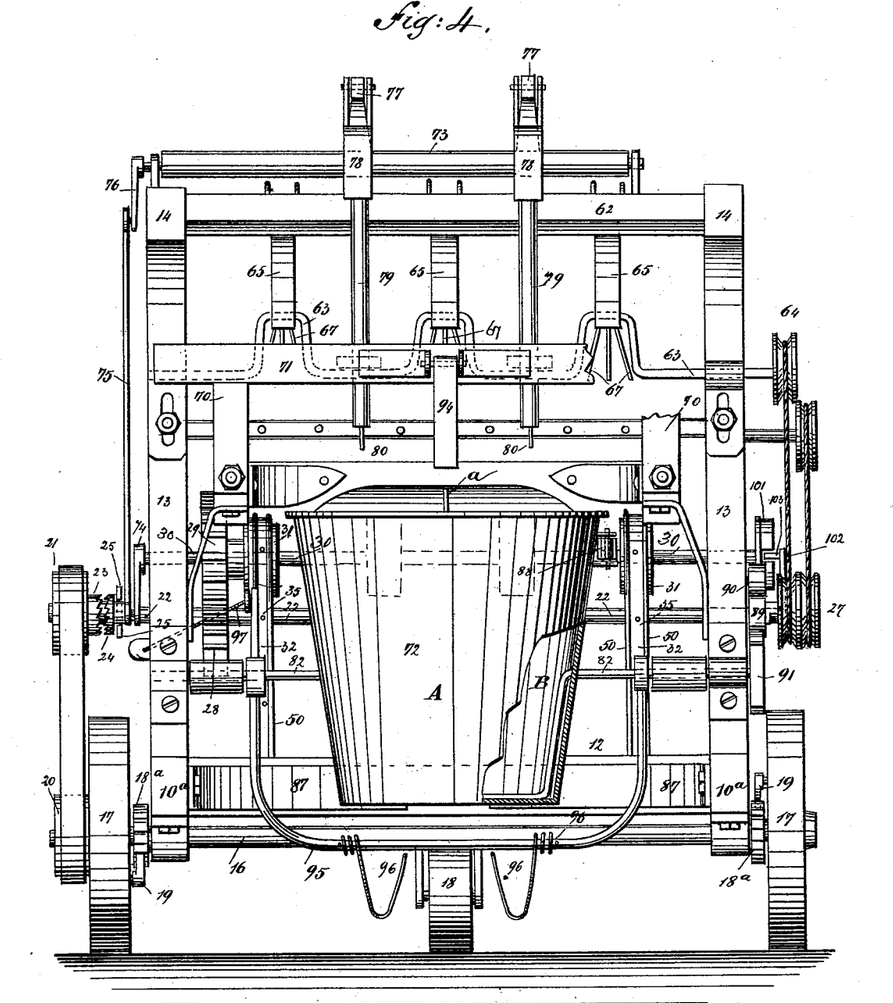
Fig. 4 is a rear elevation.

In carrying out the invention the frame of the machine consists of a base comprising the front cross-beams 10, the side beams $10^a$, and two intermediate cross-beams 11 and 12. Upon each of the side beams four vertical standards 13 are secured, graduated in length, the longest standard being at the rear of the machine. The standards are united at the top by a rearwardly and upwardly inclined beam 14, and a lower horizontal beam 15 is also employed to brace the intermediate standards. The entire frame is supported upon an axle 16, journaled near the rear in any approved manner and provided with loosely-mounted drive-wheels 17 and a caster-wheel 18, located in the center of the front beam. Between the frame and the drive-wheels a ratchet-wheel $18^a$ is secured to the axle, engaged by a pawl 19, pivoted upon the drive-wheel, as best shown in Fig. 4, whereby the axle is rotated from the drive-wheels when the machine is moved forward and remains stationary when the machine is moved backward. Upon the extremity of the axle at the left a pulley 20 is keyed or otherwise secured, which pulley is belted to a second upper pulley 21, held to slide upon the outer end of a transverse shaft 22, journaled beneath the horizontal frame-beam 15.

The pulley 21 is provided with a clutch-section 23, adapted for engagement with a second clutch-section 24, splined upon the shaft 22, which latter section is thrown in and out of gear with the clutch-section of the pulley by a lever 25, fulcrumed at the point $25^a$ upon the side frame and leading to the front of the machine, at which point it is linked with a hand-lever 26, pivoted upon the rear side of the front frame-beam, convenient to the driver's seat, said seat being secured to said beam and the lever being provided with a suitable rack $26^a$.

The shaft 22 extends from side to side of the machine, and is provided at the end opposite to that carrying the clutch with a double-grooved or twin pulley 27; and intermediate of the ends, between the side frames at the left, a spur-gear 28 is keyed, meshing with a similar gear 29, secured to a parallel transverse shaft 30, located at the rear and above the shaft 22.

The upper transverse shaft 30 is journaled upon the upper face of the frame-beam 15, and upon said shaft a series of drums 31 are secured, around each of which passes an endless belt 32, which belts also pass over similar and aligning drums 33, integral with or secured to a shaft 34, journaled beneath the base-frame between the axle and front beams of said frame.

Figure 1:
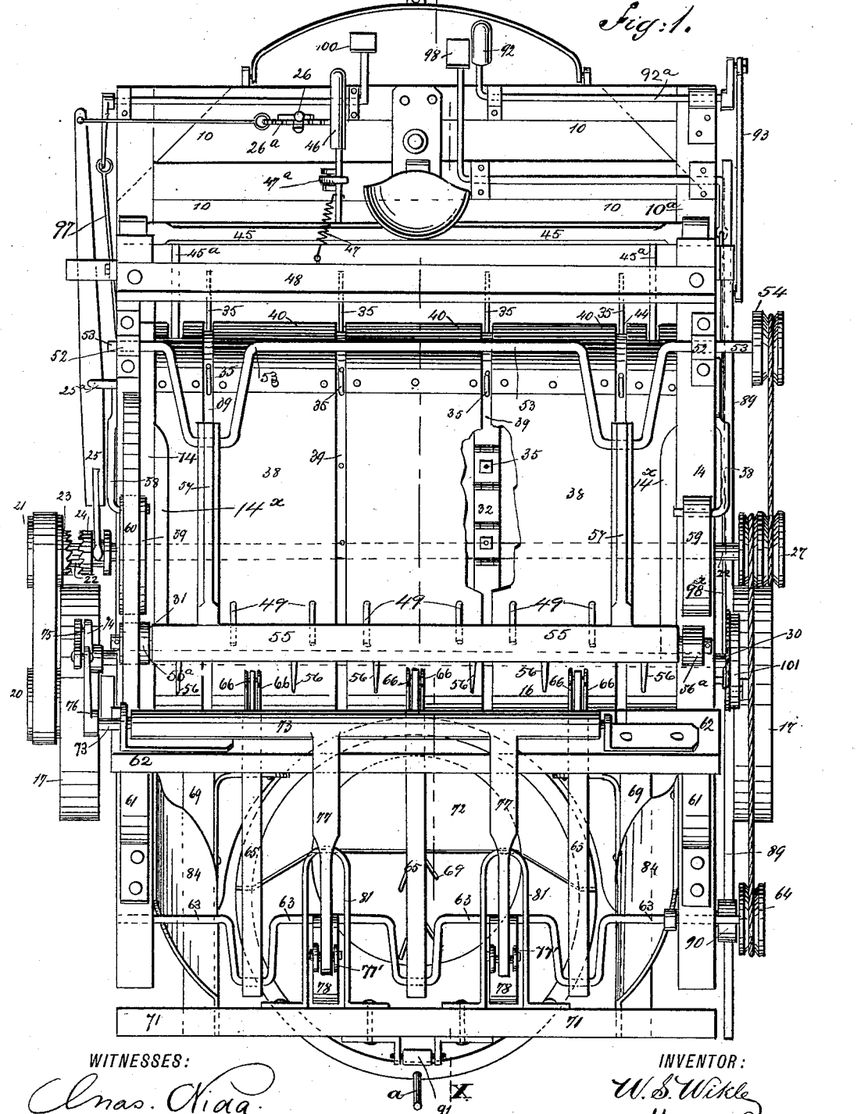
Figure 1 is a plan view of the machine.
Figure 3:
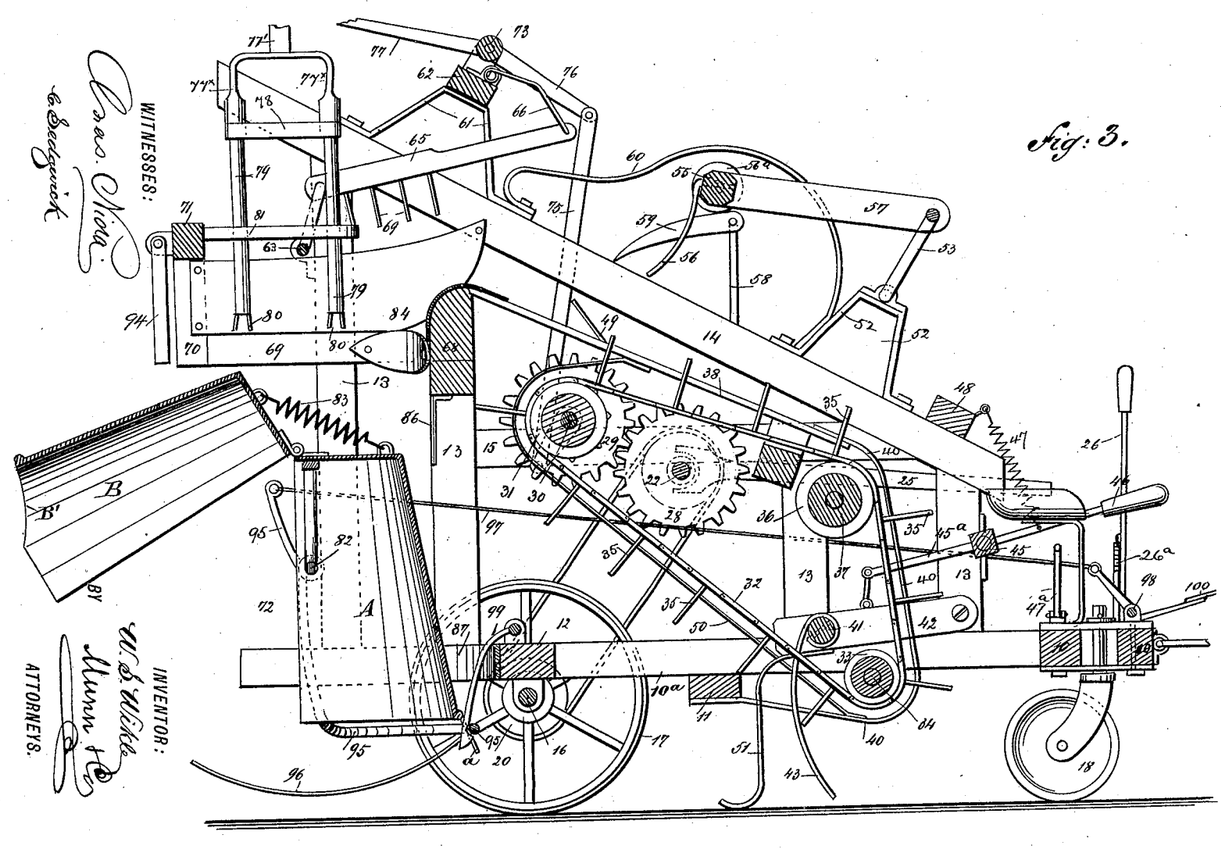
Fig. 3 is a vertical section taken, essentially, upon a central longitudinal line $x\ x$, Fig. 1.

The belts 32 are endless, and preferably consist of a series of flat links pivotally connected, in which links the heads of pins 35 are rigidly fastened, as shown in Fig. 1, the said pins being made to extend at a right angle outward from the belt, as best illustrated in Fig. 3. The belts in their travel are further supported by drums 36, fixed upon a shaft 37, transversely journaled in the side frames parallel with and above the lower drum-shaft 34.

Above the drum-shafts 30 and 37 a downwardly and forwardly inclined table 38 is supported by attachment in any approved manner to the side frames, which table is provided with a series of longitudinal slots 39, through which the several rows of pins 35 project in their passage around the drums, as illustrated in Figs. 1 and 3.

A guide-shield 40, preferably of metal, is attached to the lower end of each table-section created by the slots 39, which shields are curved downward in advance of and below the lower drum-shaft 34 and fastened to the intermediate beam 11 of the base-frame. The said shields prevent the hay from passing rearwardly between the belts, and the spaces between them also form guideways for the pins until they enter the slots 39 in their upward movement.

A rake-head 41 is pivotally supported above the lower drum-shaft 34, and consists of a transverse bar having an arm 42 attached at each end, the outer ends of the said arms being pivoted to the inner face of the forward or shortest standard of the side frame, as best shown in Fig. 3. A series of forwardly-curved rake-teeth 43 are secured to the rake-head in any suitable manner, the said teeth being so arranged as to alternate with the several endless pin-carrying chain belts. The rake-head is manipulated through the medium of a rock-shaft 45, journaled at its ends in the main frame behind the driver's seat, connected with the arms of the rake-head by links 45$^a$, which shaft is provided with a forwardly-extending handle-arm 46, which handle-arm is connected by a spring 47 with a cross-bar 48, connecting the upwardly-inclined beams 14 at the front of the machine, said spring serving to press the rake-teeth to the ground, and a latch 47$^a$, for holding the teeth in elevated position, is attached to the forward beam 10.

Figure 2:
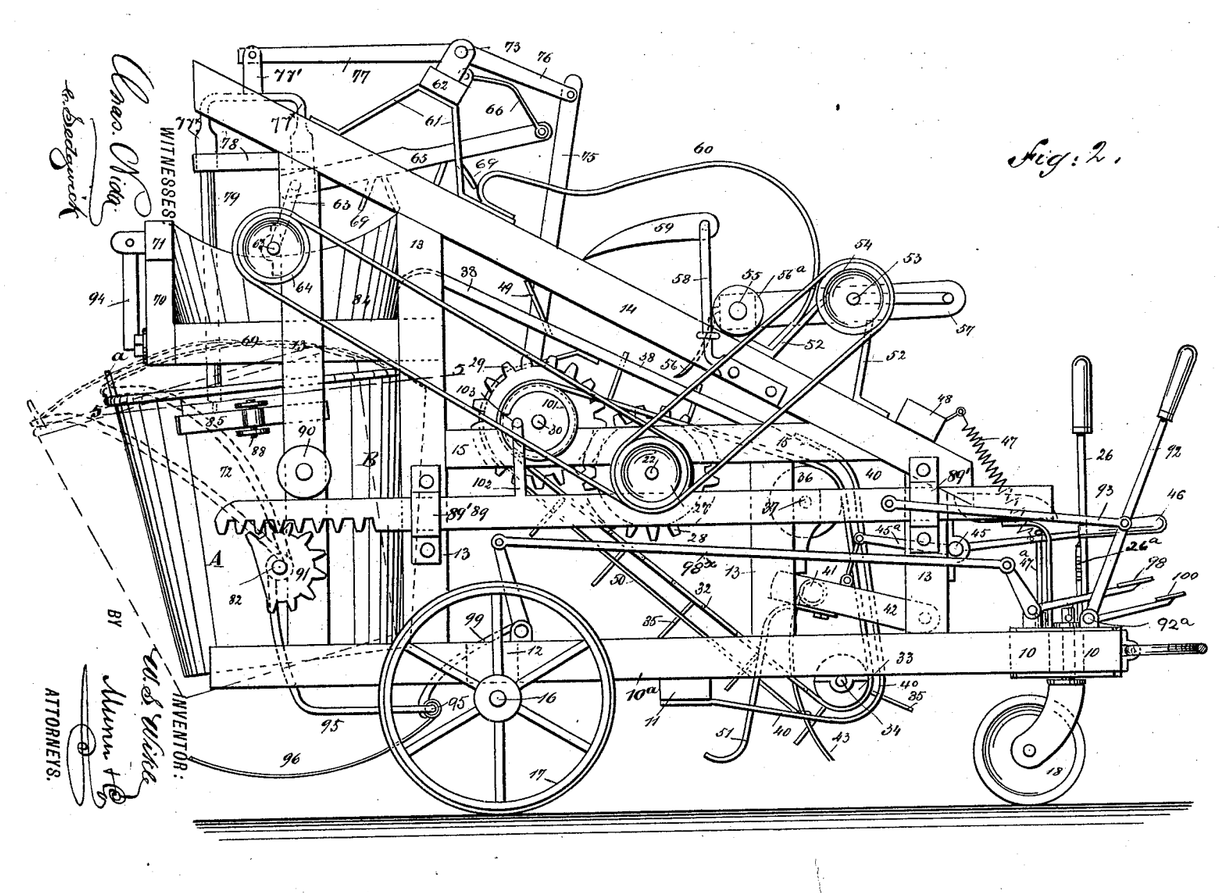
Fig. 2 is a side elevation of the same.

Each section of the table 38 is provided with one or more attached teeth 49, secured thereto above the center, having a rearward inclination, as best shown in Figs. 1, 2, and 3. The said teeth 49 are purposed to keep the hay from pulling back, when a rake, hereinafter described, located above the table, is in operation.

It will be observed by reference to Fig. 3 that the teeth upon the endless-chain belt pass down between the teeth of the ground-rake, and it will be further observed that the teeth upon the chain belt project beyond the shields 40 their full length as they start upward, gradually withdrawing as they pass across the table until they pull entirely down out of the hay. This is due to the fact that the belt does not run parallel with the table. The belt-teeth are guided in their downward course toward the ground-rake by wire guide-strips 50, one being located at each side of each belt and fastened beneath the table near its upper end at a point where the teeth pass through and to the under portion of the front guide-plates 40. The ground-rake teeth are prevented from digging into the ground by the attachment of drag arms or runners 51 to the under surface of the rake-head arms, the lower portions of which drag-arms are rearwardly curved, as best shown in Figs. 2 and 3.

Near the front of the machine brackets 52 are secured to the upper inclined bars 14 of the frame, in which brackets a crank-shaft 53 is journaled, being driven by means of a pulley 54, secured upon one end, belted to the twin pulley 27 on the shaft 22, as best shown in Fig. 2. The crank-shaft is adapted to operate an upper or table rake-head 55, which is provided with a series of teeth 56. The purpose of the table-rake is to drop in behind every row of teeth carrying up a load of hay and ascend with said teeth. The table-rake is especially desirable where scattering or spreading rakes are employed to reciprocate above the table and a shocker is used in connection therewith.

The table-rake head is provided with a friction-roller 56$^a$ at each end adapted to travel upon the inclined side beams 14 or a longitudinal projection 14$^x$ upon the inner side of the beams, as shown in Fig. 1. An arm 57 is attached to the forward face of the table-rake head near each end, which arms are pivoted to the crank-arms of the crank-shaft 53.

Slightly to the rear of the brackets 52 an angled standard 58 is secured to the side frames, the upper horizontal member of which projects inward over said frame, having pivoted thereon a guide-switch 59, the upper face of the switch being convex and the free end resting loosely upon the side beam 14, as best shown in Figs. 2 and 3. Above one or both of the switches 59 a guard-rail 60 is located. The forward end is secured to the brackets 52, and the said rail is carried upward and rearward, as best illustrated in Figs. 2 and 3, to an attachment with the said side beam 14.

In the operation of the table-rake, as the rock-shaft 53 is revolved the rollers upon the rake-head travel forward upon the upper surface of the switches beneath the guard-rail, as shown in Fig. 3, whereby they are greatly elevated above the table in this their forward movement. When the crank-arms of the crank-shaft assume a horizontal position, the rake-head, being at the limit of its forward movement, drops down upon the side beams 14, as illustrated in Fig. 2, the teeth passing in between the rows of teeth in the endless belt and reaching near the table. The further revolution of the crank-shaft causes the rollers on the rake-head to roll upon the side beams 14 beneath and beyond the switches, and the hay is carried by the rake to the upper end of the table, and so the operation is repeated, the rake being dropped down to assist each rising revolving row of teeth or pins 35.

Near the rear end of the guard-rail 60 brackets 61 are attached to the upper inclined side rail 14, which brackets are adapted to support a fixed cross-bar 62, and in suitable bearings secured to the rear standard 13, near the top, a rear crank-shaft 63 is journaled. The crank-arms thereof are all made to project in the same direction. The crank-shaft 63 is rotated from the transverse driving-shaft 22 by a belt passing over the twin pulley 27 and a pulley 64, attached to one extremity of the shaft, as best shown in Figs. 1 and 2.

The advancing end of a scattering or distributing fork 65 is pivoted to each arm of the crank-shaft 63, the heel end whereof is attached by a link 66 to the cross-bar 62 at the forward end, as best shown in Figs. 2 and 3. The forks consist of a body-bar provided with a series of prongs 67, secured in the under side, each alternate prong being made to extend outward transversely of the machine in opposite directions.

Two or more forks may be employed and are adapted to scatter the hay over a shocker secured to the rear of the machine below the table 38. The forks are so arranged that they will take the hay to deliver and distribute the same to the shocker at the moment the table-rake commences to move forward to gather another load.

From the ends of the cross-bar 68, extending from one of the intermediate standards 13 to the opposite one and supporting the table 38, longitudinal beams 69 are rearwardly projected, and vertical standards 70 are secured to the rear ends of said beams, which standards are connected at the top by a cross-piece 71. The outer face of the cross-piece 71 is preferably in vertical alignment with the shocker 72 above referred to and hereinafter described.

A rock-shaft 73 is pivoted upon the upper bracketed cross-arm 62, motion being communicated thereto through the medium of a crank 74, (see Figs. 1, 3, and 4,) secured to one extremity of the upper rear drum-shaft 30, a pitman 75, connected to the crank, and a second crank 76, secured to the rock-shaft and pivoted to the pitman. From the rear of the rock-shaft horizontal arms 77 are projected, having cross-heads 78, suspended by yokes 77' from their outer ends, which cross-heads consist of a group of two or more preferably tubular and connected downwardly-extending members 77$^\times$, into each of which members one end of a rigid packing-rod 79 is introduced and secured in any approved manner, said rods being provided at their lower extremities with two or more outwardly-bent teeth 80, as best shown in Fig. 3. Each group of packing-rods is guided in its vertical movement by horizontal staples 81, fastened to the front face of the cross-piece 71, as is also best illustrated in Fig. 3.

In the operation of the packing-bars the scattering-forks 65 are up out of contact with the hay while the packing-bars are compressing the contents of the shocker, and vice versa.

The shocker 72 is carried by a cranked rock-shaft 82, journaled in the rear standards near the base, and is divided into two sections A and B, hinged together at the bottom, the two sections being also connected at the bottom by a spring 83, whereby when unlatched at the top the sections are automatically separated.

The position of the shocker when upright is slightly below the table 38, at the rear thereof, and the sides of the frame above the shocker are provided with sheet-metal guide-plates, as shown at 84 in Figs. 2 and 3, which are given a slant inward and downward toward the top of the shocker, in order that all the hay coming up the table will be delivered therein.

The shocker is so hung as to be just balanced when full of hay, and may be constructed of any suitable material and in any suitable manner. The section A is provided with a spring-latch 85 at the top, which, engaging the keeper 85' upon the section B with its inner hooked end, normally retains the section in a closed position, a spring 85$^2$ being placed between the outer end of the said latch and the section A to press its hooked end inwardly.

Figure 5:
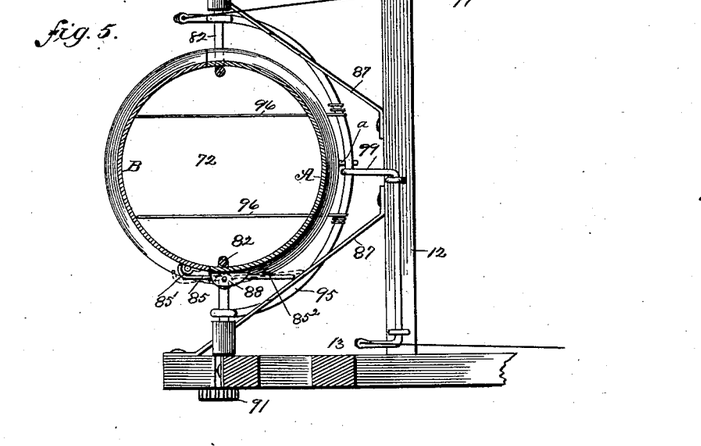
Fig. 5 is a detail horizontal section, the shocker being overturned and its latch about to engage the trip-plate 87, in full lines, and released by said trip, in dotted lines.

The forward movement of the top of the shocker is limited when in an upright position by a stop-rod 86, attached to the cross-beam supporting the table at the rear end, and when the shocker is in an inverted position the forward movement is limited by diagonal bars or plates 87, attached, respectively, to the side beams of the base at the rear inner face, and also to the rear of the base cross-beam 12, one plate or bar at each side of the center. The said plates or bars 87 are also adapted to automatically unlock the section to effectually dump the contents of the shocker. This is effected by pivoting a friction-roller 88 to the outer end of the latch 85. Thus when the shocker is inverted the said outer end of the latch is brought in contact with one of the bars or plates, which I term a "trip," and as the shocker is carried forward in this position the latch is compressed and released from the keeper, (see Fig. 5,) whereupon the spring 83, acting upon the sections, automatically open the same, as shown in Fig. 3.

The shocker-shaft is rocked and the shocker manipulated through the medium of a sliding bar 89, located upon the right side of the frame, supported in suitable bearings 89', and held in contact with friction-rollers 90, pivoted to the frame. At the rear extremity the sliding bar is toothed upon the under edge to mesh with a mutilated gear 91, fast upon the shocker-shaft. The sliding toothed bar 89 is manipulated from the driver's seat by means of an angled lever 92, fulcrumed upon the front beam of the base-frame and connected with the sliding toothed bar by a pitman or link 93.

Figure 6:
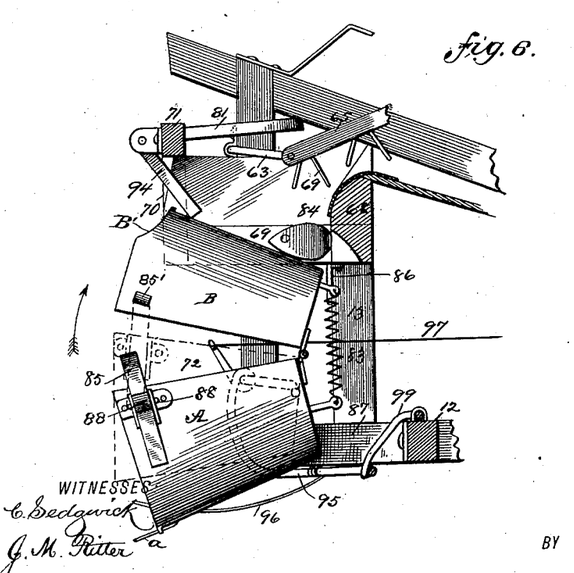
Fig. 6 is a detail sectional view on line 5 5 of Fig. 2, showing the shocker in side elevation as it appears when section B is held by the finger 94 until the section A is latched, as in dotted lines.

When the shocker, after being dumped, is raised from the position shown in Fig. 3 to its normal position, the sections are closed and locked by a finger 94, pivoted centrally upon the cross-bar 71, which engages with the side of the rising section B, which is thrown in the way of said finger by the spring 83, and retains the same until the continued movement of the shaft 82 brings the section A up to it, as shown in Fig. 6. The latch 85 will easily engage the keeper 85′, at which instant the cut-away portion B′ of the section B will pass by the finger 94 and the shocker will assume a normal position.

A curved keeper-arm 95 is pivoted at the ends upon the shocker-shaft at each side of the shocker and extends beneath the same, which keeper-arm is provided with a series of upwardly-curved and rearwardly-projecting teeth 96. One extremity of the keeper-arm is carried upward and connected by a chain or wire 97 with a foot-lever 100, fulcrumed upon the front beam of the base-frame. A spring-actuated angled latch-bar 99 is pivoted upon the base cross-beam 12, adapted to engage with and normally retain the keeper-bar beneath the shocker. The angled latch-bar is connected with a foot-lever 98, also fulcrumed upon the front cross-beam of the frame by a rod 98ˣ, the lever 98 usually being located at one side of the seat and the lever 100 at the opposite side. In operating the keeper-arm before the shocker 72 is reversed the driver places his foot upon the lever 98, and thereby releases the keeper-arm. Then pressing down upon the lever 100 the keeper-arm is raised (see dotted lines, Fig. 2) and the finger made to cover the top of the shocker and retain the hay therein until the shocker is overturned and the sections are unlocked. The upper edge of the section A has a vertically-projecting pin a, against which the keeper-arm 95 rests when its fingers are over the top of the shocker 72, and therefore when the shocker is swung outward, as in dotted lines, Fig. 2, down into the position shown in Fig. 3 the pin a will carry the keeper-arm with it until it is again engaged by the latch 99. Just previous to this the section B will have been released by its latch striking the plate 87 (see Fig. 5) and thrown outward by its spring 83 to the position shown in Fig. 3. The bar 89 must now be moved forward to cause the sections A B to swing outwardly and upwardly in the direction of the arrow, Fig. 6, into their normal locked position, the finger 94 operating as hereinbefore described. On the end of the shaft 30 is a flanged wheel 101, having an opening through its flange, and an arm 102 extends upward from the bar 89, having an inwardly-projecting pin 103, normally standing within the flange of wheel 101, by which arrangement the bar 89 can only be slid when the opening in the flange of wheel 101 and the pin 103 are in a line parallel with the bar 89, which comes in this position when the packing-arms are in the highest position.

The machine is thrown out of gear before dumping the shock, and as this action can only be effected when the packing-rods are at their highest position the shocker may be turned over without interfering with the packing-rods, or vice versa. It will be observed that the shocker may be dumped and again placed in position without stopping the team.

I do not confine myself to the exact construction shown and described, as other equivalent constructions may be substituted without departing from the spirit of the invention—as, for instance, the drums carrying the toothed chain belts 32 may be, and preferably are, equal size with the toothed wheel 29, secured to the drum-shaft, and the teeth 35 in said chain belts may be curved, in order to more effectually retain the hay when received from the ground-rake. The belts connecting the several pulleys may consist of leather, gum, or chain, as desired.

Having thus described my invention, what I claim as new, and desire to secure by Letters Patent, is—

1. In a hay rake and shocker, an upright shocker at the rear of the machine and capable of reversing, consisting of two sections hinged at their lower ends, the inner section being pivoted at its opposite sides below its center to the machine, a latch pivoted to one section, and a keeper on the other section engaged thereby when the shocker is in its vertical position, substantially as set forth.

2. In a hay rake and shocker, the combination, with a hay rake and elevator, of a shocker at the rear of the machine, and into which the hay is discharged, consisting of two sections hinged at their bottoms, united at the top by a latch, the forward one of the said sections being pivotally connected at its opposite sides with the machine, and means, substantially as described, for overturning said shocker and automatically releasing its latch, as and for the purpose set forth.

3. In a hay rake and shocker, the combination, with a hay rake and elevator, of a rock-shaft journaled at the rear of the table, a vertically-divided shocker, one section of which is secured to the said shaft, an automatically-operated spring-latch connecting said sections, a lever pivoted upon the frame of the rake, and a connection, substantially as shown and described, between the lever and rock-shaft.

4. In a hay rake and shocker, the combination, with a hay rake and elevator, rearwardly-extending angle-standards projected from the frame and connected by a cross-bar, and a vertical finger pivoted upon said cross-bar, of a shocker pivoted at the rear of the frame below the discharge end of the elevator and consisting of two sections hinged at their bottoms, and a latch uniting the sections, the said finger extending into the path of the upper edge of the inner section in its upward movement to hold said section till latched to the outer section, substantially as shown and described, between the lever and shocker.

5. In a hay rake and shocker, the combination, with a hay rake and elevator, of a shocker pivoted in the frame below and to the rear of the discharge end of the elevator, consisting of two hinged sections, a spring-latch and a keeper securing the two sections in a closed position, said latch adapted to engage and be released by the trip, and means, substantially as shown and described, for overturning the shocker, as and for the purpose specified.

6. In a hay rake and shocker, the combination, with a hay rake and elevator and an overturning shocker pivoted in the rake-frame to the rear of and below the discharge end of the elevator, of a rocking keeper-arm provided with a series of upwardly-curved teeth adapted to retain the hay in the shocker in process of dumping, and means, substantially as shown and described, for rocking the shocker and keeper-arm, as and for the purpose specified.

7. In a hay rake and shocker, the combination, with a hay rake and elevator, an overturning shocker pivoted in the rear of the rake-frame below the discharge end of the elevator, of a rocking curved keeper-arm, the ends of which are pivoted at each side of the shocker, upwardly-curved teeth secured to said arm, a latch-bar fulcrumed in the frame, adapted to retain the keeper-arm in a locked position below the shocker, levers attached to the frame of the rake at the front, and connections, substantially as described, between the said levers, the shocker, the keeper-arm, and latch-bar, respectively, as and for the purpose specified.

8. In a hay rake and shocker, the combination, with a hay rake and elevator, a rock-shaft pivoted in the rear of the rake below the discharge end of the elevator, provided with a mutilated gear at one extremity, a sectional shocker secured upon the shaft, a spring-actuated latch uniting the sections at one side near the top, a latch-trip secured to the frame beneath the shocker, of a rocking keeper-arm pivoted upon the shaft, upwardly-curved teeth secured to said arm, a latch-bar fulcrumed in the frame, adapted to lock the keeper-arm, three levers pivoted at the front of the rake, a sliding rack-bar engaging the mutilated gear and connected with one of said levers, and a link-connection between the respective remaining levers and the keeper-arm and latch-bar, substantially as and for the purpose specified.

9. In a hay rake and shocker, the combination, with a rake and elevator, of a dumping shocker pivoted at the rear and provided at the forward side of its upper edge with a vertically-projecting pin and a rocking keeper having fingers to pass over the upper open end of the shocker, a latch on the frame under the shocker to engage the said keeper, and means for releasing the latch and throwing the keeper upward, the said finger engaging the keeper when the shocker is overturned and returning it to the latch, substantially as set forth.

10. In a hay rake and shocker, the combination, with a hay-rake, an upwardly-extending and rearwardly-inclined slotted table, and a series of toothed belts beneath the table, of a shocker pivoted at the rear of the rake-frame beneath the table, a rock-shaft located above the table, and vertically-reciprocating packing-rods carried by said rock-shaft, adapted to pack the hay in the shocker, substantially as shown and described.

11. In a hay rake and shocker, the combination, with hay-elevating belts and a rake, of a dumping shocker pivoted at the rear of the elevating-belts, a rock-shaft journaled above the rake-frame near the rear, horizontal arms projected from said rock-shaft, groups of packing-rods pivotally suspended from the said horizontal arms, and means for giving them vertical reciprocating movement above the shocker, substantially as and for the purpose specified.

12. In a hay rake and shocker, the combination, with hay-elevating belts and a rake, of a dumping sectional shocker pivoted at the rear of the elevating-belts, a rock-shaft journaled above the rake-frame near the rear, arms horizontally projected from said rock-shaft, bifurcated cross-heads pivotally suspended from the horizontal arms, and packing-rods secured in the several members of the cross-heads above the shocker, substantially as and for the purpose specified.

13. In a hay rake and shocker, the combination, with hay-elevating belts and a rake, of a dumping sectional shocker pivoted at the rear of the elevating-belts, a rock-shaft journaled above the rake-frame near the rear, arms horizontally projected from the rock-shaft, a bifurcated cross-head pivotally suspended from each arm above the shocker, a packing-rod secured in each member of the cross-head, guides attached to the rake-frame embracing said rods, and diverging teeth inserted in the lower extremity of said rods, substantially as shown and described.

14. In a hay rake and shocker, the combination, with the hay rake and elevator, of a shocker located to the rear of the elevating mechanism, and a horizontal scattering-fork provided with downwardly-extending tines, located at the delivery end of the elevator, to assist the delivery of the hay from the elevating mechanism to the shocker and distribute the hay in the latter, and means for operating the scattering-fork, substantially as shown and described.

15. In a hay rake and shocker, the combination, with a hay rake and elevator, and a shocker located at the rear of the elevating mechanism, of a crank-shaft journaled in the rake-frame over the shocker, a cross-bar elevated above the shaft, and a horizontal scattering-fork pivoted at its head to each arm of the crank-shaft and linked at its other end to the cross-bar, said fork being provided along its length with tines inclined toward opposite sides of the fork, substantially as shown and described.

16. In a hay rake and shocker, the combination, with a hay-rake, an upwardly and rearwardly inclined slotted table, and toothed belts traveling beneath the table, of a series of upwardly and rearwardly inclined teeth fixed to the table, a shocker located to the rear and below the table, a crank-shaft journaled in the rake-frame above the shocker, a cross-bar elevated above the said shaft, and scattering-forks pivoted at their operative ends to the crank-shaft and linked at the other to the cross-bar, and tines secured along the under face of the forks and alternately extending in opposite directions laterally therefrom, substantially as shown and described.

17. In a hay rake and shocker, the combination, with a rake and elevator and a shocker located at the rear of the elevating mechanism, of a rock-shaft journaled forward of the shocker, packing-rods vertically suspended from said shaft over the shocker, a crank-shaft journaled above the shocker, and horizontal scattering-forks pivoted at one end to the crank-shaft and linked at the other to the rake-frame, said forks being adapted to reciprocate between the packing-rods, substantially as shown and described.

18. In a hay-rake, the combination, with the frame, an upwardly and rearwardly inclined slotted table, a ground-rake, and toothed belts traveling below the table, taking the hay from said ground-rake to and over the table, of a crank-shaft journaled upon the frame above the table, standards attached to the sides of said frame, guide-switches pivoted upon said standards, and an auxiliary table-rake operated by the crank-shaft and provided with friction-rollers at the extremities of its head, substantially as shown and described, whereby the rake will be elevated in its forward throw by traveling over the guide-switches and lowered in its rearward throw by traveling under them, substantially as shown and described.

19. In a hay-rake, the combination, with the frame, an upwardly and rearwardly inclined slotted table, a ground-rake, toothed belts traveling below the table, carrying the hay to and over said table from the ground-rake, and a crank-shaft journaled above the table, of an auxiliary or table rake operated by the crank-shaft, friction-rollers located at each end of the rake-head, a standard attached at each side of the frame, a guide-switch pivoted upon each standard and resting upon the frame, and guards attached to the frame, curving over the standards and switches, substantially as shown and described.

20. In a hay rake and shocker, the combination, with the frame, a ground-rake pivoted thereto, a rearwardly and upwardly inclined slotted table secured above the ground-rake, and toothed belts below the table carrying the hay from the ground-rake to and over the table, of a reciprocal table-rake, rearwardly and upwardly inclined teeth secured to the table, a dumping shocker located at the rear of the table, packing-rods having vertical reciprocation above the shocker, and a horizontal reciprocal fork located above the shocker and adapted to scatter the hay over the shocker, all arranged and combined for operation substantially as shown and described.

21. In a hay rake and shocker, the combination, with the shaft 30, vertically-reciprocating packing-rods, the pivoted shocker, and the rack-bar 89, of the flanged wheel 101, having an opening in its flange, and the arm 102 on the rack-bar, having pin 103, substantially as shown and described.

WILBUR S. WIKLE.

Witnesses:
J. H. CROSIER,
H. T. HOUSTON.